United States Patent Office 3,242,676
Patented Mar. 29, 1966

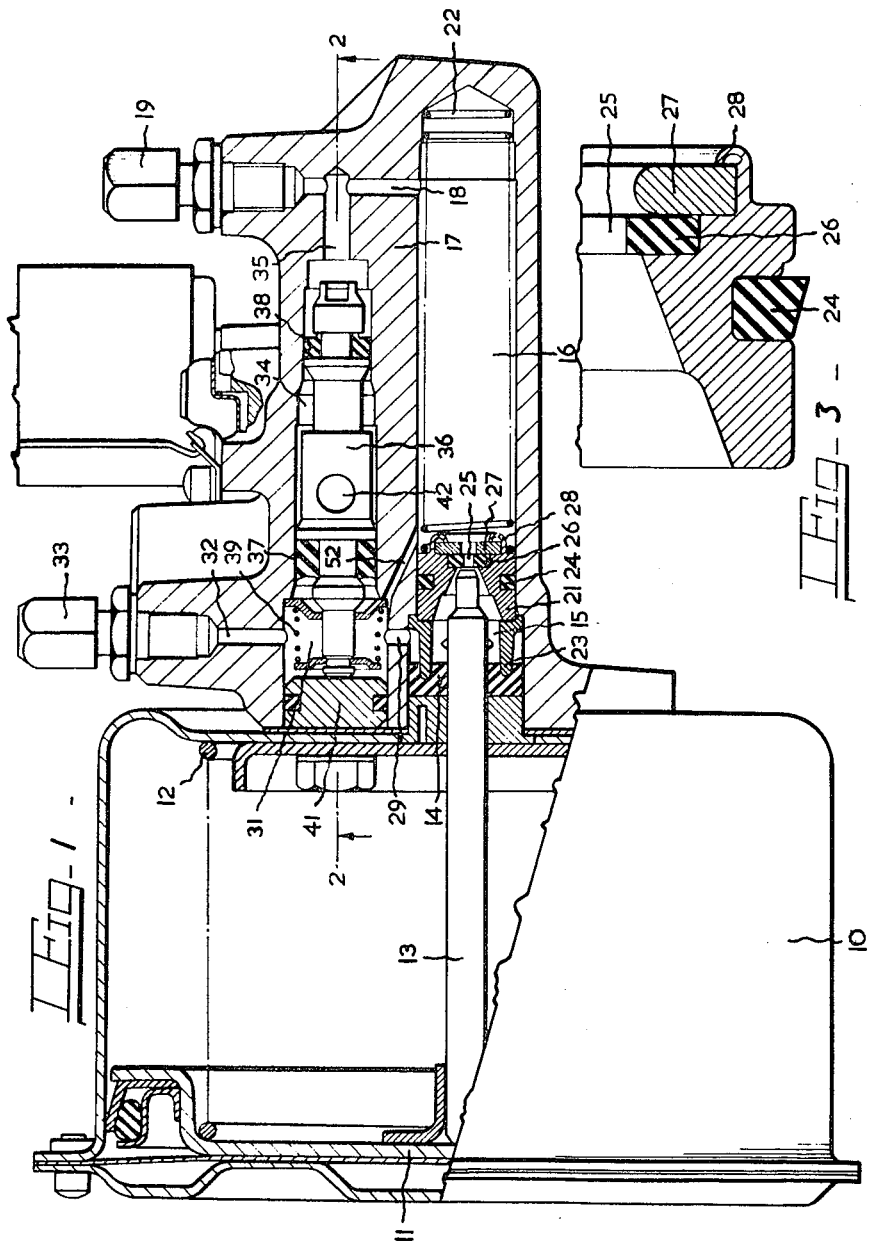

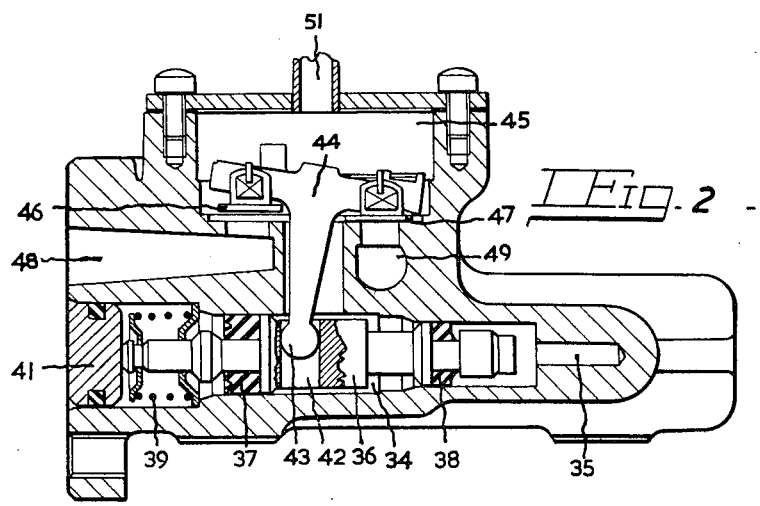

3,242,676
BOOSTER FOR BOOSTER-ASSISTED
ACTUATING SYSTEMS
Dennis William Rollason, Birmingham, England, assignor to Girling Limited, Birmingham, England, a British company
Filed Oct. 29, 1963, Ser. No. 319,755
Claims priority, application Great Britain, Nov. 1, 1962, 41,323/62
4 Claims. (Cl. 60—54.5)

This invention relates to a booster for booster-assisted fluid pressure actuating systems of the kind in which an hydraulic fluid under pressure from a master cylinder, for example a pedal-operated master cylinder, is used to act on valves controlling the flow of a second fluid, usually air, to or from a booster cylinder, the diaphragm or piston of which moves to act on the piston of an auxiliary master cylinder, thereby producing a boosted hydraulic fluid pressure in a secondary circuit. Such systems are used to operate the brakes of motor vehicles, but the invention is not limited to that particular use.

So that the hydraulic circuit from the auxiliary master cylinder is kept full of fluid, it is usual to arrange that, in the rest position of the booster, this circuit is in communication with a hydraulic fluid reservoir and normally this is acheived by putting the circuit in communication with the primary hydraulic circiut. One known arrangement for achieving this result has the piston rod of the booster extending through a chamber in communication with the primary hydraulic circuit, and in the rest position of the booster the end of this piston rod is spaced a short distance from the piston of the auxiliary master cylinder, which piston has a central aperture giving communication between the chamber and the auxiliary master cylinder. Then, as the booster comes into action, and the piston rod advances, it first closes this aperture to cut off communication and then pushes the piston into the auxiliary master cylinder. In the event of failure of the booster, the aperture remains open and hydraulic fluid can pass through it to generate at least the primary hydraulic fluid pressure in the secondary circuit.

A practical drawback with such a construction is the difficulty, during manufacture, of providing just the required clearance between the end of the piston rod and the piston of the auxiliary master cylinder in the rest position of the booster. This clearance is dependent not only on the length of the piston rod, but also on the accuracy of construction of the booster piston or diaphragm and the booster cylinder, as well as on the accuracy of the location of the booster cylinder with respect to the auxiliary master cylinder. If the clearance is too small, the secondary hydraulic circuit may be almost or even wholly cut off from the primary circuit in the rest position of the booster, with the possibly dangerous consequence that if the booster fails, litle or no fluid can pass from the primary to the secondary hydraulic circuit. On the other hand if the clearance is too large, the booster has to move an appreciable distance before it starts to engage the piston of the auxiliary master cylinder, and furthermore the engagement, when it does take place, is noisy.

According to the present invention, this clearance problem is largely overcome in a booster of the kind set out in the second paragraph above by the provision of a separate by-pass connection between the primary and secondary hydraulic circuits, this by-pass being closed only by the actual advance of the auxiliary master cylinder piston. Conveniently the bypass can be in the form of a passage communicating at one end with the primary hydraulic circuit and having its other end opening into the wall of the auxiliary master cylinder at a point which is a short way from the face of the piston when the latter is in its rest position. As the piston advances its seal cuts off this passage in a manner well known in ordinary master cylinders.

The aperture in the piston, closed by the advancing piston rod, is retained but the maintenance of the correct clearance is now of less importance. The clearance can be designed to be small, thus avoiding noisy operation, yet if manufacturing tolerances reduce the clearance to zero the normal operation of the booster and the operation of the system in the event of failure of the booster are not upset.

An assembly comprising a booster and an auxiliary master cylinder for a vehicle braking system and incorporating our invention is illustrated by way of example in the accompanying drawings:

FIGURE 1 is a longitudinal section of the assembly;
FIGURE 2 is a section on the line 2—2 of FIGURE 1; and
FIGURE 3 is a fragmentary section on a larger scale of the piston working in the auxiliary master cylinder.

In the assembly illustrated 10 is a vacuum booster cylinder of the vacuum suspended type. The piston 11 is loaded by a spring 12 which, when the pressures on opposite sides of the piston are equal, holds the piston against the left hand end of the cylinder 10. A piston-rod 13 attached to the piston 11 extends through the other end of the cylinder and through a seal 14 into a chamber 15 at the rear end of a bore 16 in a housing 17 secured to the booster cylinder. The bore 16 forms an auxiliary master cylinder of which the axis is in alignment with the piston-rod 13. The forward end of the cylinder 16 is in communication by way of a passage 18 with a union 19 adapted to be connected to the slave cylinders of the vehicle brakes.

A piston 21 works in the cylinder 16 and is normally held by a spring 22 against a stop at the rear end of the cylinder formed by a spider 23. The piston carries an annular seal 24 and there is an axial passage 25 through it formed by a central opening in a hard rubber or other washer 26 held in a recess in the forward end of the piston by a metal ring 27 which in turn is retained by rolling over inwardly a lip 28 on the piston.

The chamber 15 is in communication by way of a passage 29 with another chamber 31 in the housing into which a passage 32 leads from a union 33 which receives liquid under pressure from a pedal-operated master cylinder. The chamber 31 is formed by a counter-bore at the rear end of a stepped bore 34 of which the axis is parallel to the cylinder 16.

The forward end of the bore 34 is in communication by way of a passage 35 with the passage 18. A stepped control piston 36 working in the bore 34 is fitted with seals 37 and 38, and its rear end, which is the end of larger diameter, is exposed to the pressure in the chamber 31, that is the pressure generated by the pedal-operated master cylinder, while its forward smaller end is exposed to the pressure in the passage 18 which is the pressure applied to the vehicle brakes. The piston 36 is normally held by a spring 39 in the position shown in which an extension of its rear end engages a stop 41.

A transverse opening 42 in the control piston 36 receives a part-circular head 43 on the free end of the stem of a flat T-shaped lever 44. The head of the lever is located in a value chamber 45 and valve heads 46 and 47 pivotally mounted on opposite ends of the head co-operate with seatings of which one communicates through a passage 48 with the adjacent end of the booster cylinder and with a source of vacuum and the other communicates through a passage 49 with atmosphere. The valve chamber 45 itself is connected by a pipe 51 with the outer end of the booster cylinder.

This control mechanism for the booster forms the subject of our Patent No. 2,853,977.

An inclined by-pass passage 52 in the housing opens at its rear end into the chamber 31 and at its forward end into the wall of the cylinder bore 16 a short distance in front of the forward end of the piston 21 when the latter is in its fully retracted position.

In the off position of the brakes the various parts of the assembly are in the positions shown. The booster piston 11 is at the extreme left-hand end of its travel, the forward end of the piston-rod 13 which is tapered is withdrawn from the central opening 25 in the piston 21 of the auxiliary cylinder, the control piston 36 is in its extreme left-hand position, and the valve 46 is lifted from its seating so that both sides of the booster piston are exposed to vacuum.

When the pedal-operated master cylinder is actuated fluid under pressure is supplied through the connection 33 and the passage 32 to the chambers 31 and 15. The fluid is forced from the chamber 15 through the opening 25 in the piston 21 into the auxiliary cylinder 16 in front of the piston to initiate the application of the brakes. Fluid can also flow from the chamber 31 into the cylinder through the by-pass 52.

As the pressure builds up it moves the control piston 36 to the right owing to the difference in the areas of the two ends of that piston so that the lever 44 is rocked over to close the valve 46 and open the valve 47. Air is thus admitted to the rear end of the booster cylinder behind the piston 11 which moves to the right taking with it the piston-rod 13. The tapered end of the piston-rod engages and closes the central opening in the piston 21 and urges the piston to the right. After a short movement of the piston the by-pass 52 is closed and pressure is built up in the cylinder 16 and applied to the brakes to an extent under the control of the control piston 36.

The central opening in the piston allows free flow of fluid when brakes are being bled, and the by-pass 52, which is of small cross-section, allows a leak back of fluid which might otherwise be trapped between the booster and the slave cylinders if the brakes have been very heavily applies or if an increased volume of fluid has been forced into the pipe line leading to the slave cylinders by repeated operations of the pedal. This additional volume of fluid might, without the by-pass, maintain the brakes in the applied position.

I claim:
1. A booster-assisted hydraulic braking system in which fluid pressure produced manually in a primary hydraulic circuit controls energisation of a fluid-pressure booster actuating a rod which acts on a piston working in an auxiliary master cylinder in a secondary hydraulic circuit, the rod when advanced by the booster closing an axial passage in the piston through which the primary and secondary systems are normally in communication, characterised in that there is provided between the primary and secondary circuits a by-pass which is normally open but is closed by the forward movement of the piston in the application of the brake.

2. A booster-assisted hydraulic braking system as claimed in claim 1 in which the by-pass comprises a passage communicating at one end with the primary hydraulic circuit and opening at the other end into the wall of the auxiliary master cylinder a short distance in front of the front end of the piston when the piston is in its normal fully retracted position.

3. A booster-assisted hydraulic braking system as claimed in claim 1 in which the pressure in the primary circuit is generated by a pedal-operated master cylinder and is applied to a chamber where it acts on a control piston which controls the energisation of the booster, and this chamber is in direct communication with a second chamber at the rear of the piston in the auxiliary master cylinder and is connected by the by-pass to the cylinder in front of the piston when the piston is in its fully retracted position.

4. A booster and auxiliary master cylinder assembly for an hydraulic braking system in which the booster actuates a rod adapted on energisation of the booster to close a central opening in a piston working in an auxiliary master cylinder and to advance the piston to apply the brakes, characterised in that a chamber behind the piston is connected by a by-pass independent of the opening in the cylinder in front of the piston, the by-pass being closed by the forward movement of the piston in the application of the brakes.

No references cited.

SAMUEL LEVINE, *Primary Examiner.*

R. R. BUNEVICH, *Assistant Examiner.*